G. H. VAN COURT.
BOTTLE HOLDING RECEPTACLE.
APPLICATION FILED JULY 13, 1910.
980,852.
Patented Jan. 3, 1911.
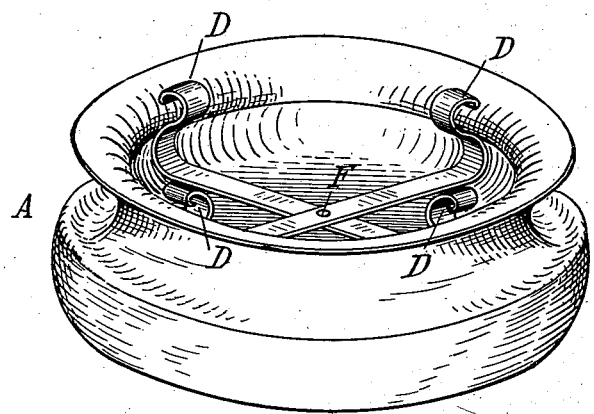
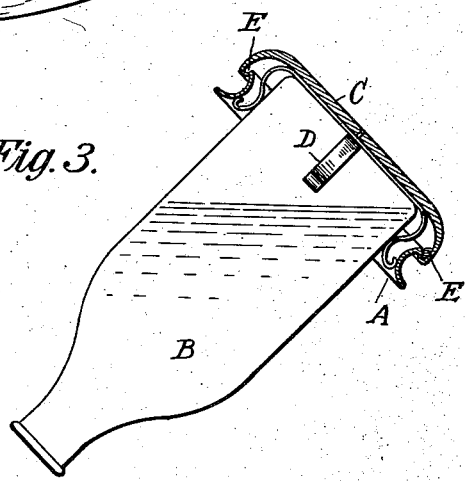
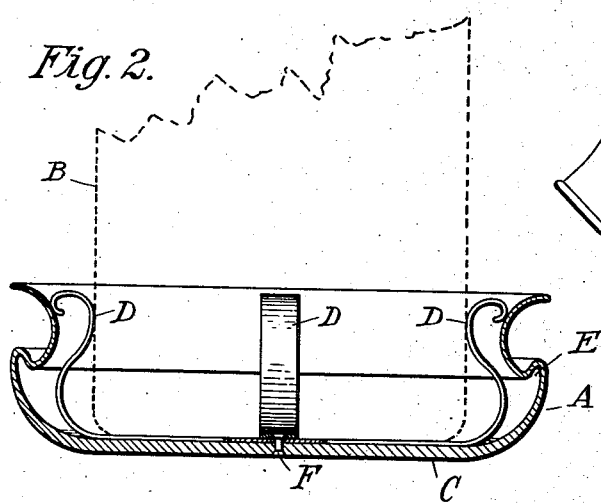
Witnesses:
Inventor:
George H. Van Court
By James H. Birmingham Atty.

UNITED STATES PATENT OFFICE.

GEORGE H. VAN COURT, OF CHICAGO, ILLINOIS.

BOTTLE-HOLDING RECEPTACLE.

980,852.　　Specification of Letters Patent.　　Patented Jan. 3, 1911.

Application filed July 13, 1910. Serial No. 571,827.

*To all whom it may concern:*

Be it known that I, GEORGE H. VAN COURT, a citizen of the United States, residing at Chicago, in the county of Cook and State of Illinois, have invented a new and useful Improvement in Bottle-Holding Receptacles, of which the following is a specification.

My invention relates to receptacles for holding bottles and other liquid holding devices, and is to provide a bottle holding receptacle, comprising a drip cup, a trifle larger in circumference than the bottle, the cup having springs in its interior adjusted so as to permit the passage of the bottle into the receptacle, and hold same firmly when inserted therein so that bottle and holder may be used inseparably while in use on the table. The holding cup or receptacle catches the drippings which always flow down the outside of the bottle and soil the table or table cloth.

Figure 1 is a perspective view of my bottle holding receptacle ready to receive the bottle. Fig. 2 is a cross section of same showing the bottle held in position. Fig. 3 shows my bottle holding receptacle when tilted to an angle, to pour out contents of bottle.

Like letters refer to similar parts throughout the several views.

The bottle holding receptacle may be made of any suitable material.

Referring to Fig. 2 it will be seen that the sides of the receptacle A are made in an inwardly and outwardly swelling form which may be termed an ogee shape, the bottom C of the receptacle being flat in order that it may rest firmly wherever placed, springs D hold the bottle B firmly. It is designed to have the receptacle A of a larger size than the bottle B, so as to leave a space between the bottle B and wall of receptacle A for the fluid which usually flows down the outside of a bottle after same has been opened and used; the walls of receptacle A are bent or distended outwardly from a point E at about midway from the top to the bottom C forming a gutter to catch the drippings it is designed to retain, so that the drippings cannot escape therefrom when bottle B with attached receptacle is lifted from the table and turned on its side to pour out the contents of bottle, the springs D are made to attach to the bottom C by a swivel or rivet F.

I do not limit myself to any particular position of the gutter E; it may be located at any point between the top and bottom of the interior of said walls.

The receptacle may be round, square, or such other shape as may be desired, round being preferable.

Having now fully described my invention, what I claim as new and desire to secure by Letters Patent is:

The herein described bottle holding receptacle comprising a circular tray formed with a flat bottom and sides, the said sides of the tray being ogee shaped and intermediate portions thereof being formed with a downwardly and inwardly facing annular trough, while the portions of the sides above this downwardly and inwardly facing trough are flared outwardly, a pair of intersecting spring strips resting upon the bottom of the tray and having the ends thereof extended upwardly adjacent the sides of the tray for engagement with a bottle, and a fastening member securing the intersecting portions of the spring strips to the center of the bottom of the tray.

GEORGE H. VAN COURT.

Witnesses:
JOHN STUART ROBERTS,
W. S. SWINEY.